D. JANKOWER.
JEWEL BEARING FOR SCALES.
APPLICATION FILED OCT. 2, 1917.

1,290,564.

Patented Jan. 7, 1919.

WITNESSES:
James Hart Robertson
Geo. Emrich

INVENTOR
David Jankower

UNITED STATES PATENT OFFICE.

DAVID JANKOWER, OF NEW YORK, N. Y.

JEWEL-BEARING FOR SCALES.

1,290,564.

Specification of Letters Patent.

Patented Jan. 7, 1919.

Application filed October 2, 1917. Serial No. 194,334.

*To all whom it may concern:*

Be it known that I, DAVID JANKOWER, a citizen of the United States, and resident of New York city, in the county of New York and State of New York, have invented certain new and useful Improvements in Jewel-Bearings for Scales, of which the following is a specification.

My invention relates to improvements in jewel-bearings for scale balance pivots for which in the past agate has chiefly been used, and of late, owing to a scarcity of agate, metal alone, which, though greatly inferior for the purpose, has largely had to be adopted.

The object of my invention is: 1st; to again make possible the free use of agate for jewel bearings for scales, and to do so at even a greatly lesser cost than heretofore, by means of using only a fractional amount of the agate as heretofore required; 2d; to make it possible also to advantageously utilize more valuable and better jewel material for the purpose such as garnet, sapphire, and ruby, which heretofore could not be employed economically enough because of the quantity of material required for making the jewel bearings as in the past.

I attain the object stated by means as illustrated in the accompanying drawing.

Figure 1:
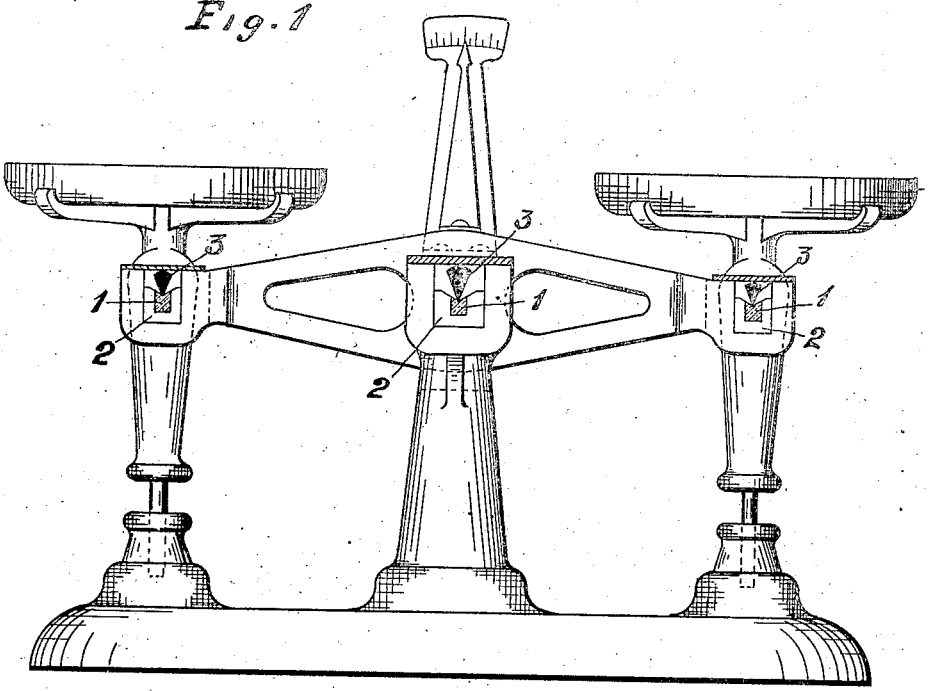
Figure 2:
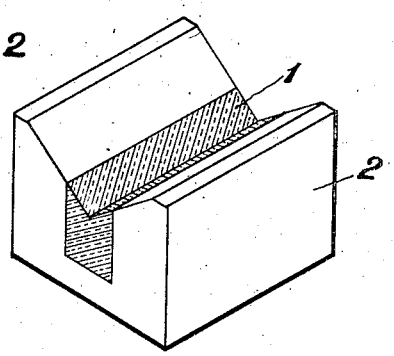
Figure 3:
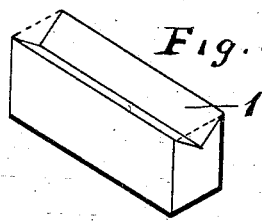

Figure 1 is a vertical view of the scale balance embodying my improvement; Fig. 2, a perspective view of my improvement, detached from the scale balance; Fig. 3, perspective view of jewel bearing, detached from block shown in Fig. 2.

Similar numerals refer to similar parts throughout the several views.

Referring now to Fig. 1, 1 is a jewel bearing inserted in metal block, 2; 2, metal block arranged to fit in seat of scale balance; 3, knife edge steel pivot arranged to rest on agate bearing 1.

As constructed previously the entire block, indicated in the present invention by numerals 1, and 2, was made in one piece of agate and the cost of material and the labor in cutting and polishing the large surface of the same was considerable.

I reduce this cost materially by forming the outer part of the combination block, 1, and 2, out of metal or other suitable cheap material, and only use a strip of jewel large enough to serve as a bearing for pivot 3.

This strip of jewel is V-shaped on its upper surface and is snugly fitted into a slot in metal block 2, which metal block 2, has preferably its upper surface partially of a V-shape so that the lines will merge into those of the upper surface of the strip of jewel material and serve to guide the steel pivot 3 into the V-shaped slot at the upper surface of the said strip of jewel material.

To more thoroughly secure the agate to the metal block, it may be coated with cement before being pressed into the slot of same, and the V-shaped slot of the jewel bearing may be ground to shape after being inserted in the metal block, or may be ground, or only partially ground, before being inserted in the same. As a substitute for metal, rubber or other suitable plastic material may be used. The rubber in such case should be molded to the agate block or strip and then vulcanized.

Having now fully described my invention, what I desire to claim by United States patent is:

1. In a jewel bearing, the combination of a scale balance with a removable metal block to which is secured a strip, or block of jewel material, the upper surface of which is V-shaped, and a knife-edge steel pivot contacting with and resting in the V-shaped slot of the said strip.

2. In a scale balance, a metal block having secured to its upper part a strip of jewel material having a V-shaped slot, in combination with a steel pivot adapted to rest in the said V-shaped slot.

3. The combination of a scale balance with a removable metal block to which is rigidly secured a block of jewel material, with a slot on its upper surface adapted to be in loose contact with the pivots carrying the movable parts of the said scale balance.

4. In a jewel bearing, the combination of a block of jewel material, having a V-shaped slot on its upper surface, with a metal block surrounding the said agate block on three sides, the said metal block having its upper surface formed at a double angle of approximately the same degree as that of the V slot in the jewel bearing.

5. In a scale balance; the combination of a strip of jewel material having a V shaped slot in its upper surface, inserted in a block of metal; the said block of metal being integral with the said strip of jewel material, and both together forming a block adapted to fit into the bifurcated top of a supporting rod in connection with a scale balance.

Signed at New York city in the county of New York and State of New York this the 1st day of October A. D. 1917.

DAVID JANKOWER.

Witnesses:
JAMES HART ROBERTSON,
GEO. EMRICH.